US006977913B1

(12) United States Patent
Ishii et al.

(10) Patent No.: US 6,977,913 B1
(45) Date of Patent: Dec. 20, 2005

(54) RADIO COMMUNICATION DEVICE FOR RADIO PACKET COMMUNICATION SYSTEM

(75) Inventors: Kenichi Ishii, Tokyo (JP); Tomoki Osawa, Tokyo (JP)

(73) Assignee: NEC Corporation, (JP)

( * ) Notice: Subject to any disclaimer, the term of this patent is extended or adjusted under 35 U.S.C. 154(b) by 0 days.

(21) Appl. No.: 09/744,358

(22) PCT Filed: Jul. 21, 1999

(86) PCT No.: PCT/JP99/03896

§ 371 (c)(1), (2), (4) Date: Jan. 22, 2001

(87) PCT Pub. No.: WO00/05843

PCT Pub. Date: Feb. 3, 2000

(30) Foreign Application Priority Data

Jul. 21, 1998 (JP) ................................ 10-205682

(51) Int. Cl.[7] ................................................ H04G 7/00

(52) U.S. Cl. ...................................... 370/329; 370/338

(58) Field of Search ............................... 370/329, 330, 370/337, 338, 341, 347, 401

(56) References Cited

U.S. PATENT DOCUMENTS 5,715,295 A * 2/1998 Yamashita .................. 455/455
5,883,887 A * 3/1999 Take et al. .................. 370/329
6,198,924 B1 * 3/2001 Ishii et al. .................. 455/434
6,459,690 B1 * 10/2002 Le Strat et al. ............. 370/332
6,563,806 B1 * 5/2003 Yano et al. ................. 370/330
6,700,875 B1 * 3/2004 Schroeder et al. .......... 370/252

FOREIGN PATENT DOCUMENTS

EP 0 737 018 A2 10/1996
JP 8-139753 5/1996
JP 8-256153 10/1996
JP 8-289368 11/1996
JP 8-298687 11/1996
JP 9-8808 1/1997

OTHER PUBLICATIONS

Japanese Office Action issued Feb. 28, 2001 in a related application with English translation of relevant portions.
"A Proposal Packet DCA for Wireless LAN System" Ishii et al., C&C Res. Labs, NEC Corporation, 1996.
HAAS, Z.J., "On the performance of a medium access control scheme for the reconfigurable wireless networks," MILCOM 97 Proceedings Monterey, CA, (1997), pp. 1558-1564.

(Continued)

*Primary Examiner*—Ricky Ngo
*Assistant Examiner*—Christine Ng
(74) *Attorney, Agent, or Firm*—Dickstein, Shapiro, Morin & Oshinsky, LLP.

(57) ABSTRACT

A radio communication apparatus in a radio packet communication system constituted by a plurality of radio stations and having a plurality of radio channels is provided. To allow radio stations belonging to different radio links to directly communicate with each other, when a packet as data is to be transmitted, a channel control section (101) inquires of a channel registration section (102) about a radio channel used for reception by a radio station corresponding to the destination address in input transmission data, and a radio channel used for packet transmission is selected. The packet is then transmitted from a transmission/reception section (103) via the selected radio channel. When a packet is to be received, the radio channel in the transmission/reception section (103) is switched to the self-station radio channel stored in a self-station channel storage section (104).

14 Claims, 9 Drawing Sheets

OTHER PUBLICATIONS

TOH, C-K., "Associativity-Based Routing for Ad-Hoc Mobile Networks," Wireless Personal Communications, Kluwer Academic Publishers, NL., vol. 4, No. 2, March 1997, pp. 103-139.

Universal Mobile Telecommunications System (UMTS); UMTS Terrestrial Radio Access (UTRA); Concept evaluation (UMTS 30.0.0), December 1997, pp. 144-172.

* cited by examiner

RADIO COMMUNICATION DEVICE FOR RADIO PACKET COMMUNICATION SYSTEM

TECHNICAL FIELD

The present invention relates to a radio communication apparatus in a radio packet communication system and, more particularly, to a radio communication apparatus in a radio packet communication system constituted by a plurality of radio stations and having a plurality of radio channels (to be simply referred to as channels hereinafter).

BACKGROUND ART

A radio LAN system is one of radio packet communication systems that have recently been standardized as systems for implementing high-speed data transmission by radio. In this radio LAN system, a plurality of radio stations form one radio link and share one channel by CSMA/CA (Carrier Sense Multiple Access with Collision Avoidance). In the radio LAN system, if adjacent radio links use the same channel, the throughput decreases due to cochannel interference. Conventionally, in the radio LAN system, as a technique of preventing interference from radio waves forming different radio links, the technique disclosed in Ishi et al., "Proposal of Packet DCA for Radio LAN" (Proceedings of 1996 IEICE Society Conference B-652) (reference 1) is available.

The technique disclosed in this reference 1 is characterized as follows. To prevent interference between one radio station belonging to a given radio link and the other radio station belonging to another radio link in a single radio communication system, each radio station transmits/receives a control packet upon forming a new radio link. When a given radio station receives a control packet from another radio station, the radio station determines that the corresponding channel is used by the other radio station in the same radio communication system, and selects a channel for which a control packet from another radio station is not received, thereby preventing interference with other radio stations in the same radio communication system.

In the radio LAN system, in communication between radio stations belonging to different radio links, when the two radio links are connected to a single wire network via base stations and the like, the radio station on the transmitting side transmits a packet to a base station connected to the radio link to which the self-station belongs, and the base station transfers the packet to a base station connected to the radio link to which the radio station on the receiving side belongs via the wire network. The base station connected to the radio link to which the radio station on the receiving side belongs transmits the packet to the radio station on the receiving side, thereby implementing communication.

In the conventional systems, no consideration is given to communication between radio links using different channels. For this reason, in a radio packet communication system like the radio LAN system described above, communication cannot be efficiently performed.

According to the channel selection method described in reference 1 and the like, different channels are used for adjacent radio links. When two radio stations belonging to the respective radio channels are to communicate with each other, they cannot directly communicate with each other, because they use different channels, regardless of whether they are located at a distance from each other within which direction communication is allowed.

In addition, as described above, although communication can be performed via a wire network in some cases, when, for example, two radio stations belong to radio links to which no base stations are connected or base stations, if any, are connected to different wire networks, the two radio stations cannot communicate with each other. In some cases, therefore, in a radio packet communication system like the radio LAN system described above, even radio stations that are otherwise capable of direction communication cannot communicate with other by using the conventional radio communication apparatus.

In communication via a wire network, as described above, since communication between radio stations and base stations is performed via two radio links, the radio channel usage is twice that for direct communication. Therefore, when radio stations belonging to different radio links communicate with each other, the number of used channels doubles as compared with the case of direct communication.

DISCLOSURE OF INVENTION

The present invention has been made in consideration of the above situation, and has as its object to provide a radio communication apparatus in a radio packet communication system, in which when a given radio station belonging to a given radio link transmits a packet to a radio station belonging to a different radio link, if this remote radio station is located at a distance within which direction communication is allowed, the packet is transmitted by using the channel used by the remote radio station to increase the probability of communication between radio stations, and the packet is directly transmitted to the remote radio station to reduce the number of used channels.

In order to achieve the above object, according to the first aspect of the present invention, there is provided a radio communication apparatus in a radio packet communication system, characterized by comprising a section for registering a channel used by a remote radio station, a section for selecting a channel that is registered and used by a destination radio station for a packet to be transmitted, and a section for transmitting/receiving the packet by using the selected channel, wherein if the channel used by the destination radio station for the packet to be transmitted is registered, the packet is transmitted by using the channel used by the destination radio station.

According to the second aspect of the present invention, there is provided a radio communication apparatus in a radio packet communication system, characterized by comprising a section for searching and determining whether a channel used by a destination radio station is registered, wherein if the channel used by the destination radio station for a transmission packet is not registered, the packet is transmitted via a channel used by a self-station.

According to the third aspect of the present invention, there is provided a radio communication apparatus in a radio packet communication system, characterized by comprising a section for notifying that a self-station cannot receive any packet, and a section for notifying that the self-station can receive a packet after a packet is transmitted, wherein a remote radio station can be notified whether the self-station can receive a packet.

According to the fourth aspect of the present invention, there is provided a radio communication apparatus in a radio packet communication system, characterized by comprising a section capable of performing communication by simultaneously using two channels, wherein communications can be simultaneously performed by using the two channels.

According to the fifth aspect of the present invention, there is provided a radio communication apparatus in a radio packet communication system, characterized by comprising a section for searching for a channel used by a destination radio station and registering the found channel, wherein the channel used by the destination radio station for a packet to be transmitted can be known.

According to the sixth aspect of the present invention, there is provided a radio communication apparatus in a radio packet communication system, characterized by comprising a section for searching for a channel by transmitting/receiving a control packet at the time of a channel search, wherein a channel used by a destination radio station for a packet to be transmitted can be known.

According to the respective aspects of the present invention, the following advantages can be obtained.

Since this apparatus has a means for performing direct communication by using a channel used by a destination ration station for a transmission packet, the apparatus can directly communicate with a radio station which belongs to a radio link using a different channel. This makes it possible to reduce the number of used channels and implement efficient communication.

If the channel used by a destination radio station for a transmission packet is not registered, a packet can be transmitted by using the channel used by the self-station as in the conventional radio communication apparatus. Even if, therefore, a channel is not registered, performance equivalent to that of the conventional radio communication apparatus can be provided.

In addition, when the self-station notifies a remote station that it cannot receive any data, the remote station can delay the transmission of a packet. This makes it possible to reduce losses of packets addressed to the self-station while another channel is used.

When this apparatus has a transmission/reception section for receiving a packet addressed to the self-station and a transmission/reception device for transmitting a packet by using another channel, a packet addressed to the self-station can be received while a packet is transmitted by using another channel, thereby reducing packet losses while packets are transmitted by using another channel.

Furthermore, since the channel used by a destination radio channel for a transmission packet can be automatically searched out and registered, even if the channel used by the destination radio channel for a transmission packet is not registered, a packet can be transmitted by using the channel used by the destination radio station.

The above and many other objects, aspects, and advantages of the present invention will be apparent to those skilled in the art by the following detailed description of the preferred embodiments conforming to the principle of the present invention in conjunction with the accompanying drawings.

BEST MODE OF CARRYING OUT THE INVENTION

Several preferred embodiments of the present invention will be described in detail below with reference to the accompanying drawings. Assume that in each embodiment, each radio station has a unique address, and a transmission packet as data to be transmitted contains the address of a destination radio station.

Figure 1:
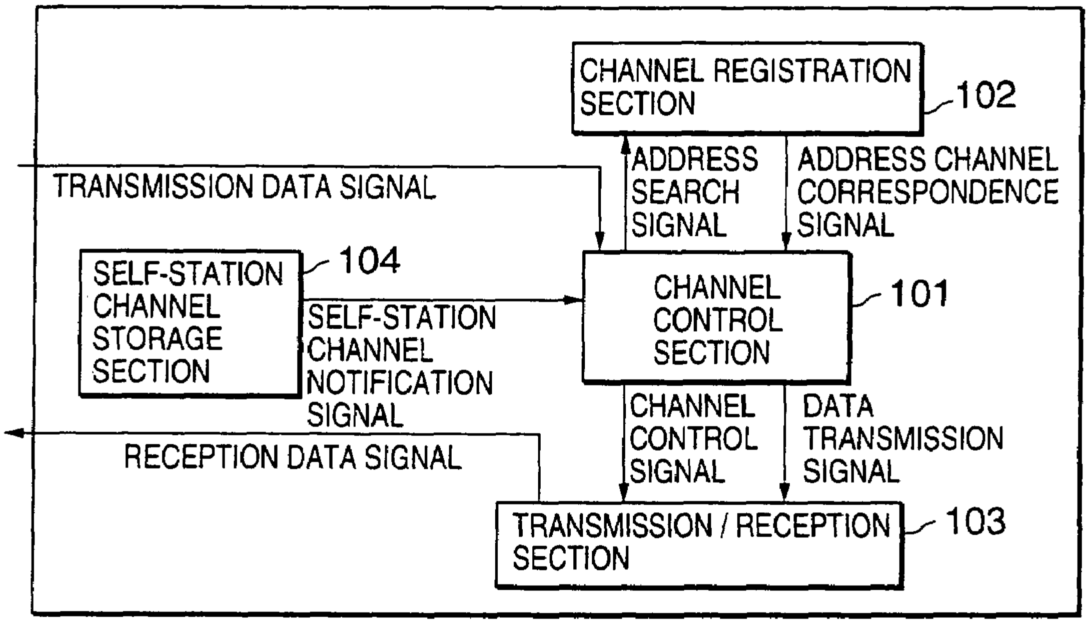
FIG. 1 is a block diagram showing the schematic arrangement of the first embodiment of the present invention.

FIG. 1 is a block diagram showing the schematic arrangement of the first embodiment of the present invention. A radio communication apparatus of the first embodiment of the present invention is comprised of a channel control section 101, a channel registration section 102 in which the correspondences between addresses and channels are registered, a transmission/reception section 103 for performing communication by using a radio channel, and a self-station channel storage section 104 storing a channel which the self-station uses for data reception.

When a transmission data signal is input at the time of data transmission, the channel control section 101 notifies the channel registration section 102 of the address signal contained in the transmission data signal by using an address search signal. The channel registration section 102 searches the correspondences between the registered addresses and channels on the basis of the input address signal and notifies the channel control section 101 of the resultant data as an address/channel correspondence signal.

The channel control section 101 notifies the transmission/reception section 103 of a channel control signal on the basis of the input address/channel correspondence signal, and also notifies the transmission/reception section 103 of the transmission data signal.

The transmission/reception section 103 changes the channel on the basis of the channel control signal and transmits the transmission data signal to a radio channel. At the time of data reception, a reception data signal is output from the transmission/reception section 103.

The operation of the first embodiment of the present invention will be described next with reference to FIG. 1 and FIGS. 2 to 4 which show flow charts.

Figure 2:
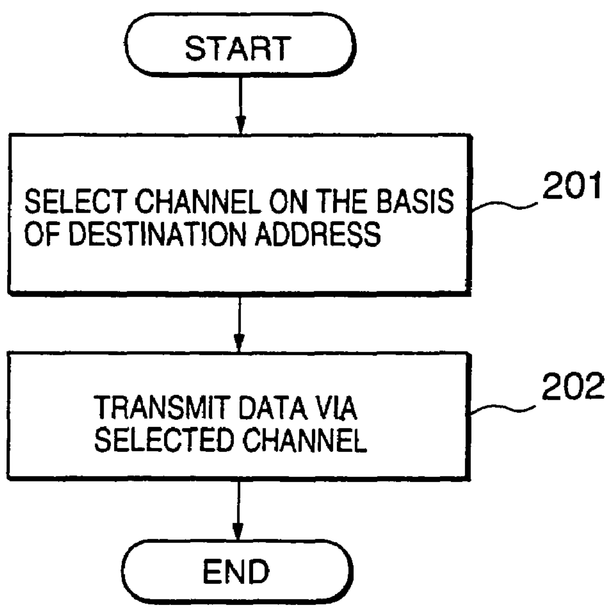
FIG. 2 is a flow chart showing the transmitting operation of a radio communication apparatus according to the present invention.

At the time of data transmission, as shown in FIG. 2, the channel control section 101 selects a channel used for data transmission by inquiring of the channel registration section 102 about the channel which the radio station corresponding to the destination address in an input transmission data signal is using for reception (step 201), and transmits the data via the selected channel (step 202).

Figure 3:
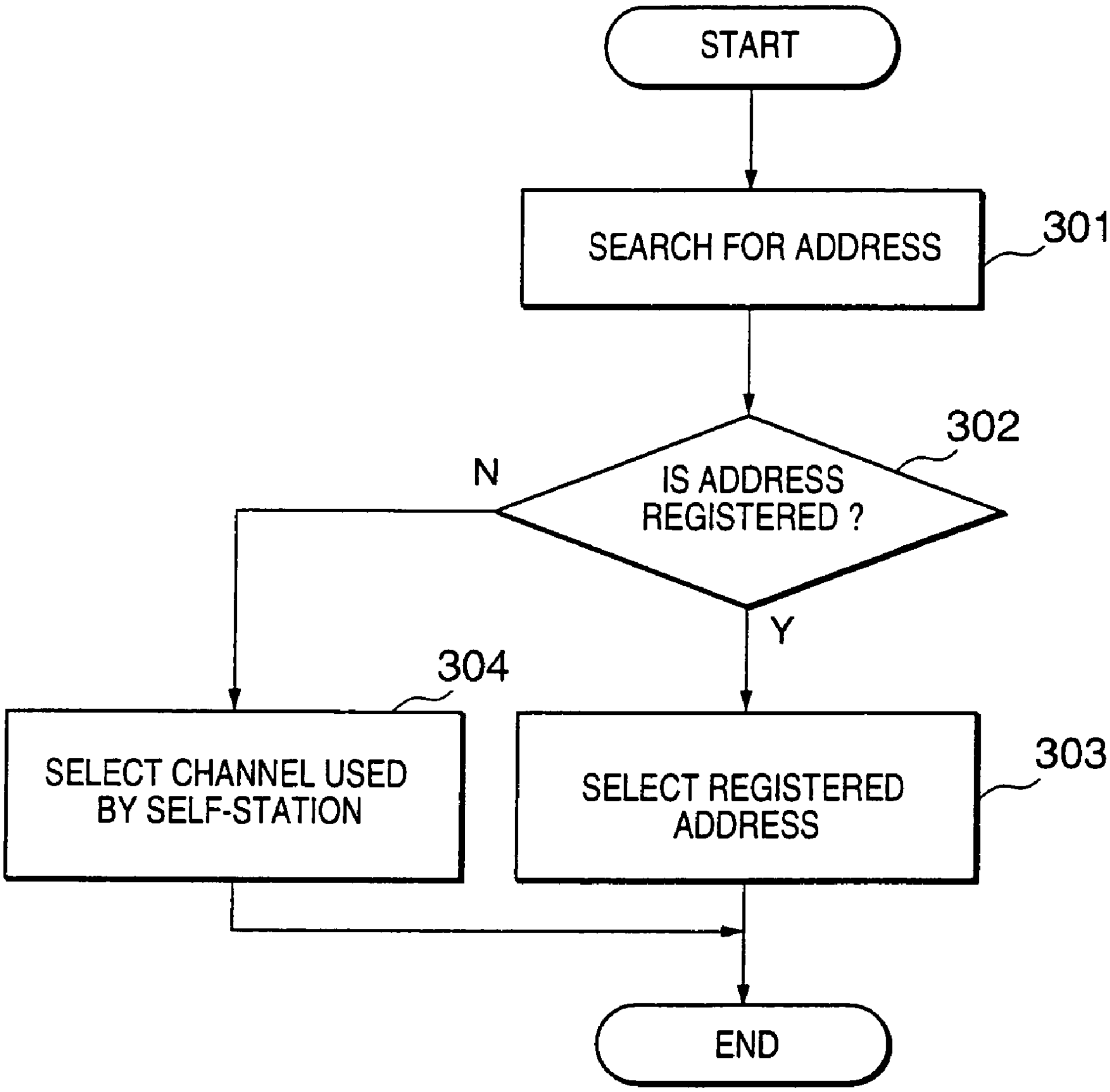
FIG. 3 is a flow chart showing detailed operation in a channel selection procedure in FIG. 2.

FIG. 3 shows the details of a channel selection procedure based on the destination address in step 201 in FIG. 2. At the time of channel selection, the channel control section 101 searches the correspondences between the registered addresses and channels on the basis of the destination address (step 301). If the corresponding channel is registered in the channel registration section 102 (Y in step 302), the registered channel is selected (step 303). If the corresponding channel is not registered in the channel registration section 102 (NO in step 302), the channel control section 101 selects the channel which the self-station is using for data reception (step 304).

Figure 4:
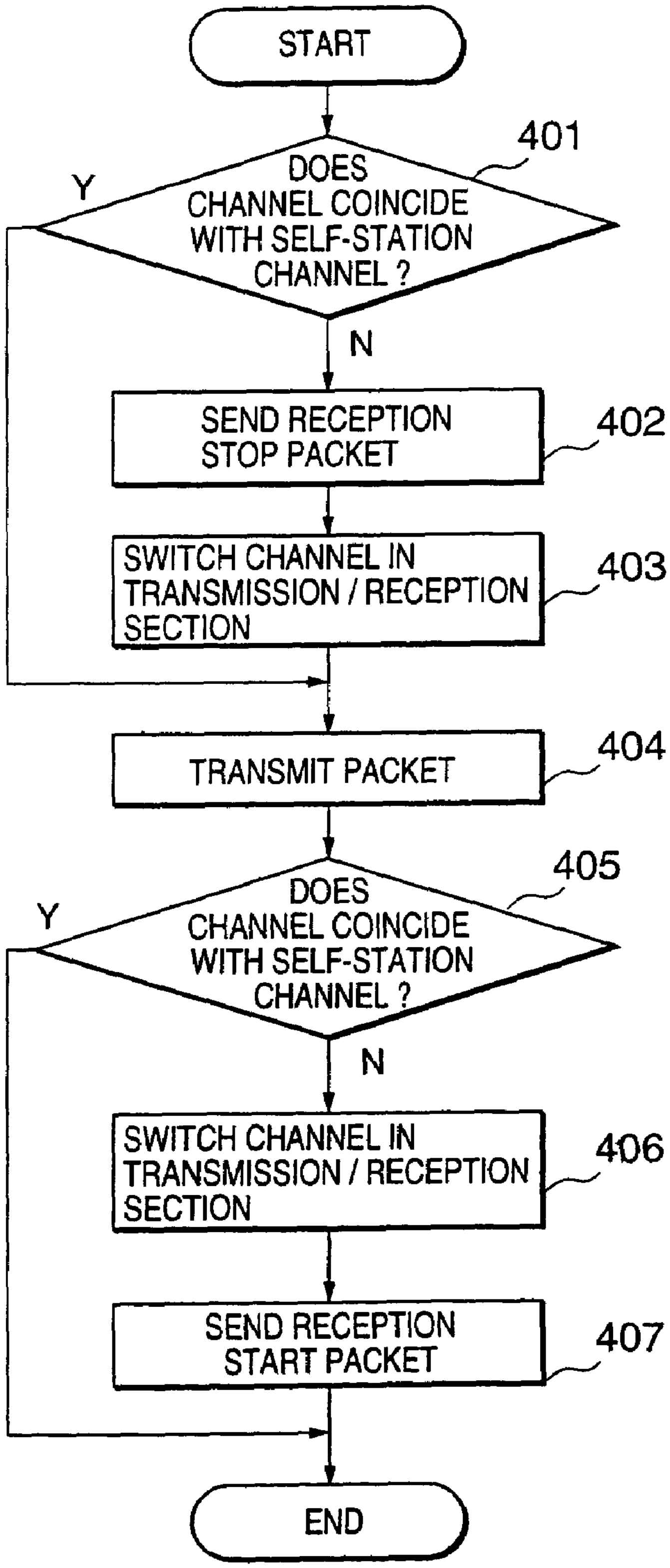
FIG. 4 is a flow chart showing detailed operation in a packet transmission procedure using a selected channel in FIG. 2.

FIG. 4 shows the details of a data transmission procedure in step 202 in FIG. 2. If the channel selected from the channel registration section 102 in step 201 differs from the channel notified by a self-station channel notification signal stored in the self-station channel storage section 104 (N in step 401), the channel control section 101 sends a reception stop package to the remote radio station and also notifies it that the self-station will switch to another channel (step 402). The channel control section 101 then notifies the transmission/reception section 103 of the selected channel to perform channel switching (step 403), and transmits a packet via the selected channel (step 404).

If the selected channel is the same channel as that used by the self-station (Y in step 401), the channel control section 101 transmits a packet via the channel set by notifying the transmission/reception section 103 of transmission data (step 404).

If the selected channel differs from the channel used by the self-station after the end of packet transmission (N in step 405), the channel control section 101 notifies the transmission/reception section 103 of the channel used by the self-station to switch the channel in the transmission/reception section to the channel used by the self-station (step 406), and sends a reception start packet to the remote radio station to notify it that the self-station has resumed reception via the self-station channel (step 407).

If the selected self-station channel is the same as that stored in the self-station channel storage section 104 and used by the self-station (Y in step 405), the channel control section 101 neither performs channel switching processing for switching to the self-station channel nor sends a reception start packet.

Figure 5:
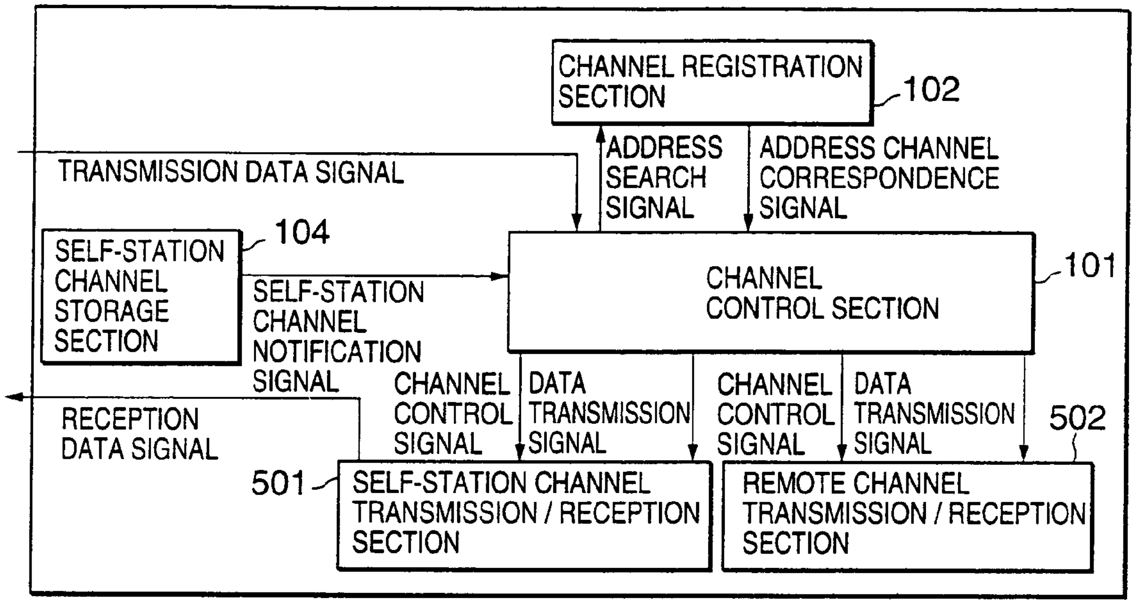
FIG. 5 is a block diagram showing the schematic arrangement of the second embodiment of the present invention.

FIG. 5 is a block diagram showing the schematic arrangement of the second embodiment of the present invention. The second embodiment of the present invention is comprised of a self-station channel transmission/reception section 501 and remote channel transmission/reception section 502 in addition to a channel control section 101, channel registration section 102, and self-station channel storage section 104 as in the first embodiment. When transmission/reception is to be performed via the channel used by the self-station, it is done by using the self-station channel transmission/reception section 501. When transmission/reception is to be performed by using a channel other than the channel used by the self-station, it is done by using the remote channel transmission/reception section 502.

Figure 6:
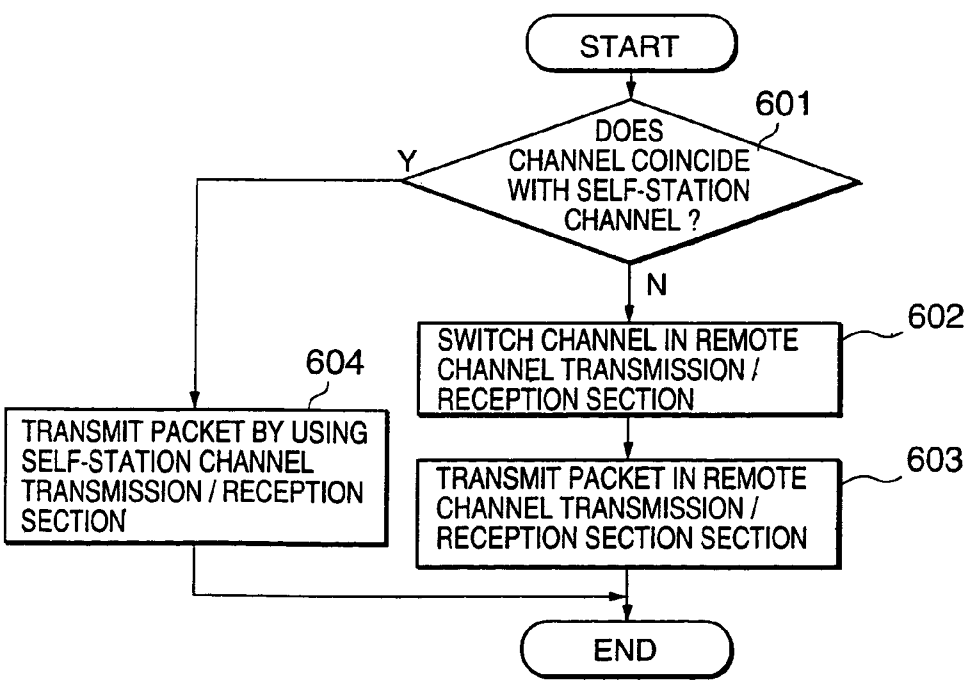
FIG. 6 is a flow chart showing detailed operation in a packet transmission procedure according to the second embodiment of the present invention.

The operation of the second embodiment of the present invention will be described next with reference to FIG. 6. FIG. 6 shows detailed operation in the second embodiment, which corresponds to the data transmission procedure in step 202 in FIG. 2.

If the channel selected in step 201 in FIG. 2 differs from the channel used by the self-station (N in step 601), the channel control section 101 notifies the remote channel transmission/reception section 502 of the selected channel to perform channel switching (step 602), and transmits a packet by using the remote channel transmission/reception section 502 (step 603). If the selected channel is the same as that used by the self-station (Y in step 601), the channel control section 101 transmits a packet by using the self-station channel transmission/reception section 501 (step 604).

In the second embodiment, if the channel selected in step 201 differs from the channel notified by a self-station channel notification signal stored in the self-station channel storage section 104, there is no need to send a reception stop packet to the remote radio station and notify it that the self-station will switch channels. This makes it possible to improve the efficiency of transmission/reception processing.

Figure 7:
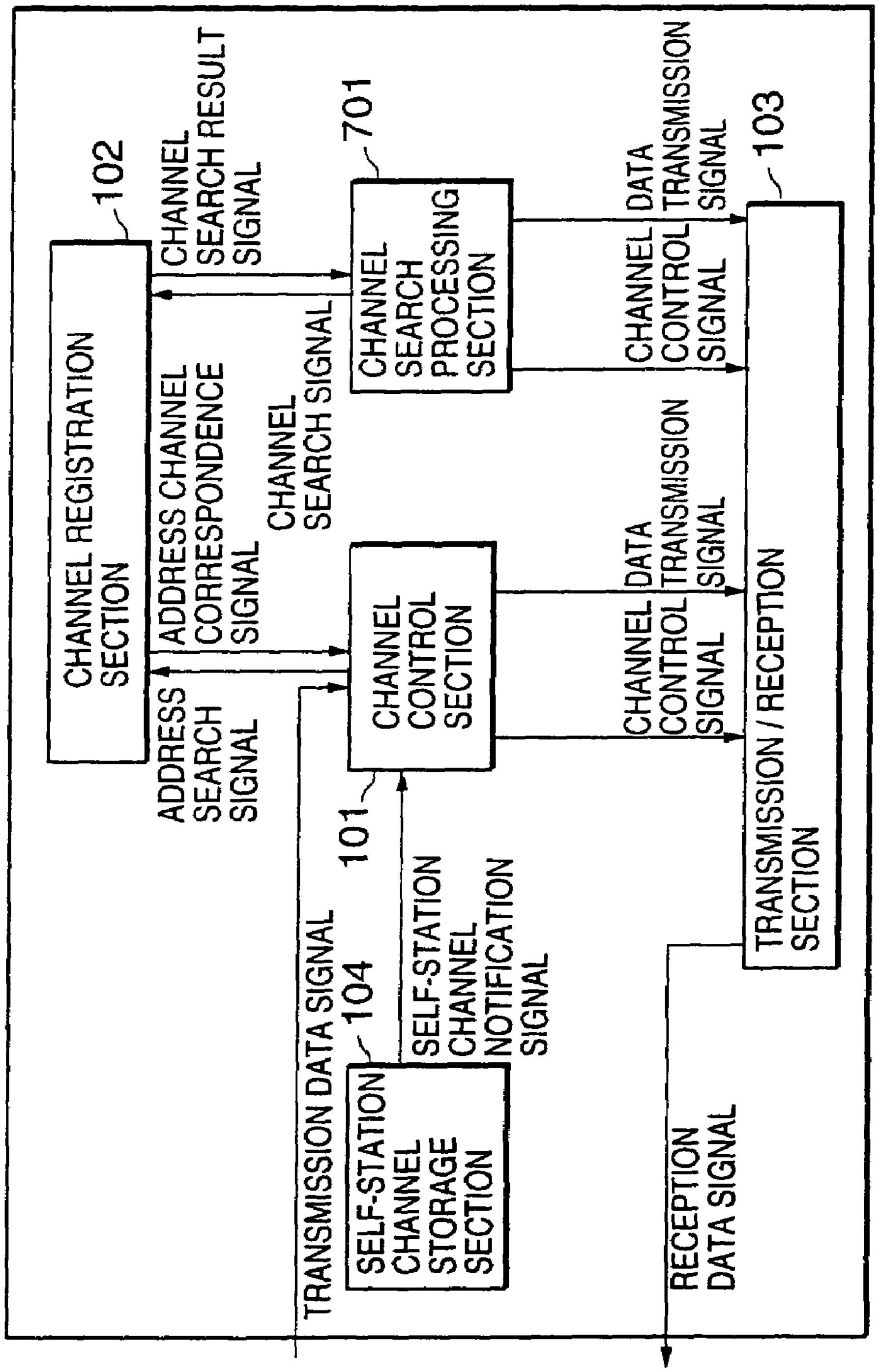
FIG. 7 is a block diagram showing the schematic arrangement of the third embodiment of the present invention.

FIG. 7 is a block diagram showing the schematic arrangement of the third embodiment of the present invention. The third embodiment of the present invention is comprised of a channel search processing section 701 in addition to a channel control section 101, channel registration section 102, transmission/reception section 103, and self-station channel storage section 104 as in the first embodiment.

The channel search processing section 701 searches the correspondences, between addresses and channels which are not registered in the channel registration section 102, on the basis of an input address signal. If there is a radio station that has a corresponding destination address, the channel search processing section 701 selects the corresponding channel number and notifies the channel control section 101 of the number as an address/channel correspondence signal. The channel search processing section 701 also registers the correspondence between the destination address and the selected channel number in the channel registration section 102.

If the channel corresponding to the destination address is not registered, the channel registration section 102 notifies the channel search processing section 701 of the corresponding information by using a channel search signal. Upon reception of the channel search signal, the channel search processing section 701 searches for a channel corresponding to the destination address, and notifies the channel registration section 102 of the search result by using a channel search result signal.

Figure 8:
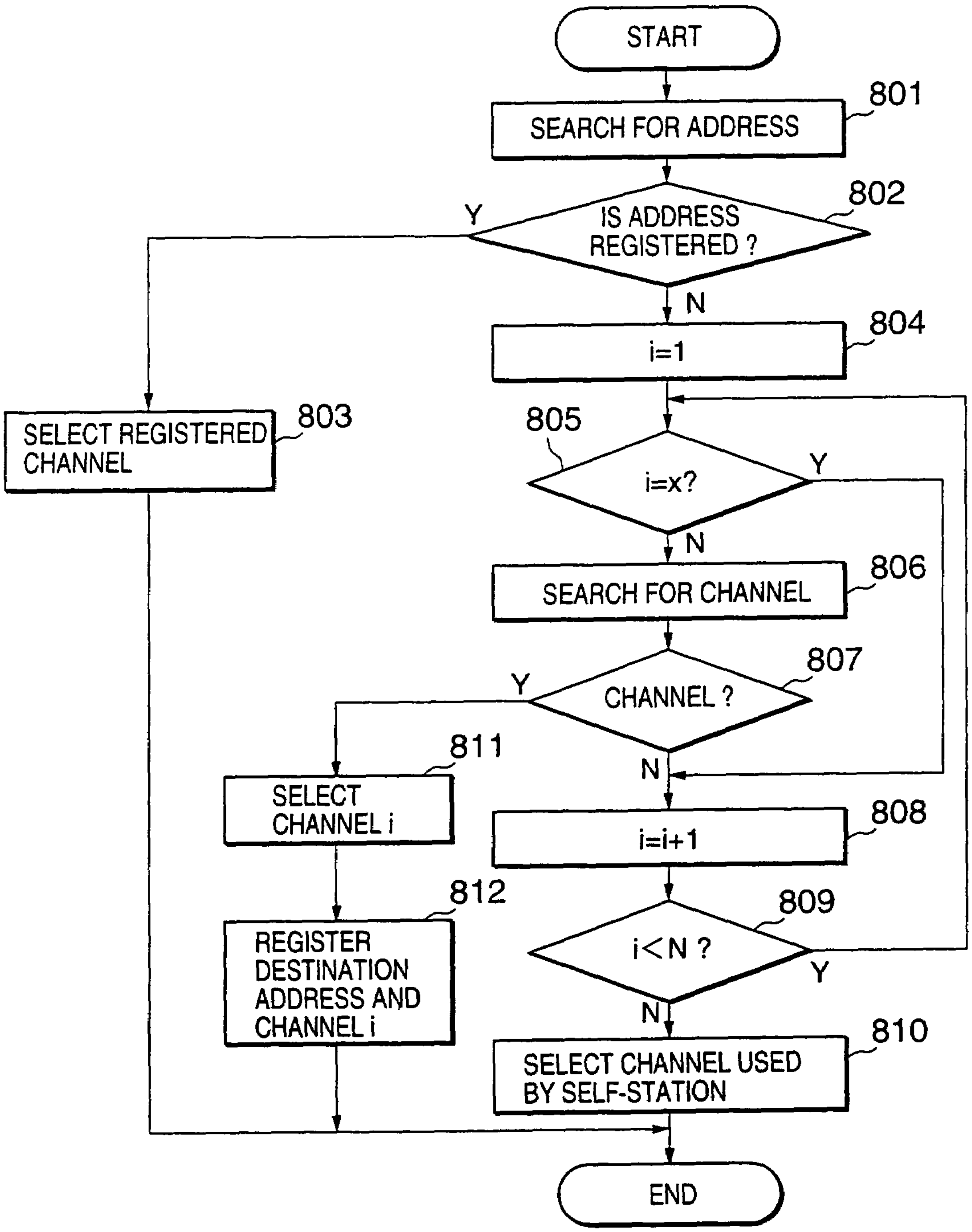
FIG. 8 is a flow chart showing detailed operation in a channel selection procedure according to the third embodiment of the present invention.

The operation of the third embodiment of the present invention will be described next with reference to FIGS. 8 and 9. Note that FIG. 8 shows the details of the operation of the third embodiment, which corresponds to the channel selection procedure based on the destination address in step 201 in FIG. 2.

At the time of channel selection, the channel control section 101 searches the correspondences between the registered addresses and channels on the basis of the destination address (step 801). If the corresponding channel is registered (Y in step 802), the channel control section 101 selects the registered channel (step 803). If the corresponding channel is not registered (N in step 802), i=1 is set (step 804).

Assume that in the third embodiment, the total number of channels is N, and the numbers 1 to N are assigned to the respective channels. “i” represents the number of a channel undergoing a search. “x” represents the number of the channel used by the self-station. If a channel undergoing a search differs from the channel used by the self-station (N in step 805), the channel control section 101 searches for a radio station having the destination address (step 806).

If it is determined after the search that there is no radio station having the destination address (N in step 807), and the channel undergoing a search is the one used by the self-station (Y in step 805), the channel control section 101 increments the channel number by one (step 808). If it is determined that "i" is equal to or smaller than N and not all the channels have been searched (Y in step 809), the flow returns to step 805 to search the next channel.

If it is determined on the basis of the result from step 808 that "i" becomes larger than N and all the channels have been searched (N in step 809), the channel control section 101 selects the channel which the self-station is using (step 810). If it is determined on the basis of the search result in step 806 that there is a radio station having the destination address (Y in step 807), the channel control section 101 selects the channel having a channel number "i" (step 811), and registers the correspondence between the destination address and the selected channel "i" in the channel registration section 102 (step 812).

Figure 9:
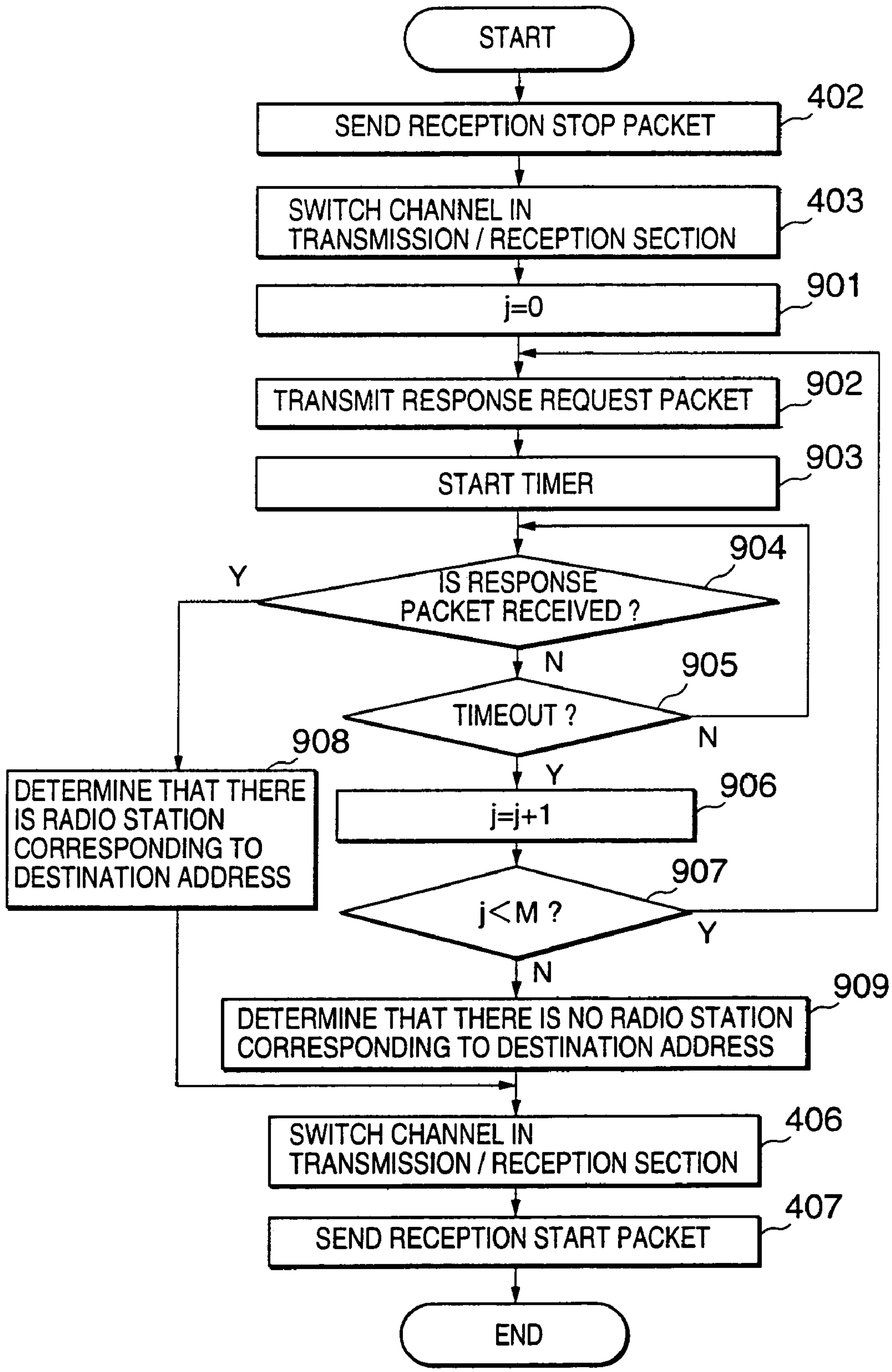
FIG. 9 is a flow chart showing detailed operation in a channel search procedure in FIG. 8.

FIG. 9 shows the details of operation in the procedure for searching for a radio station having the destination address in step 806 in FIG. 8. In the third embodiment, upon reception of a response request packet, the channel registration section 102 returns a response packet. At the time of a search, the channel control section 101 sends a channel switching packet (step 402), and switches the channel in the transmission/reception section to another (step 403).

The channel control section 101 then sets "j" representing the number of times of retransmission of a control packet to 0 (step 901), transmits a response request packet to the destination address (step 902), and starts a timer (step 903). The channel control section 101 then waits for the reception of a response packet (step 904) until the timer causes a timeout (step 905). When the timer reaches a predetermined value and causes a timeout (Y in step 905), one added to "j" (step 906).

If it is determined that "j" is equal to or less than M (Y in step 907), the flow returns to step 902 to repeatedly transmit the response request packet. In this case, M is a predetermined upper retransmission count limit value. If "j" exceeds the upper retransmission count limit value (N in step 907), it is determined that there is no radio station corresponding to the destination address (step 909).

If a response packet is received before the timer causes a timeout (Y in step 904), it is determined that there is a radio station corresponding to the destination address (step 908), and the flow advances to steps 811 and 812 in FIG. 8. Thereafter, the channel control section 101 switches the channel in the transmission/reception unit to the channel used by the self-station (step 406), sends a reception start packet (step 407).

Figure 10:
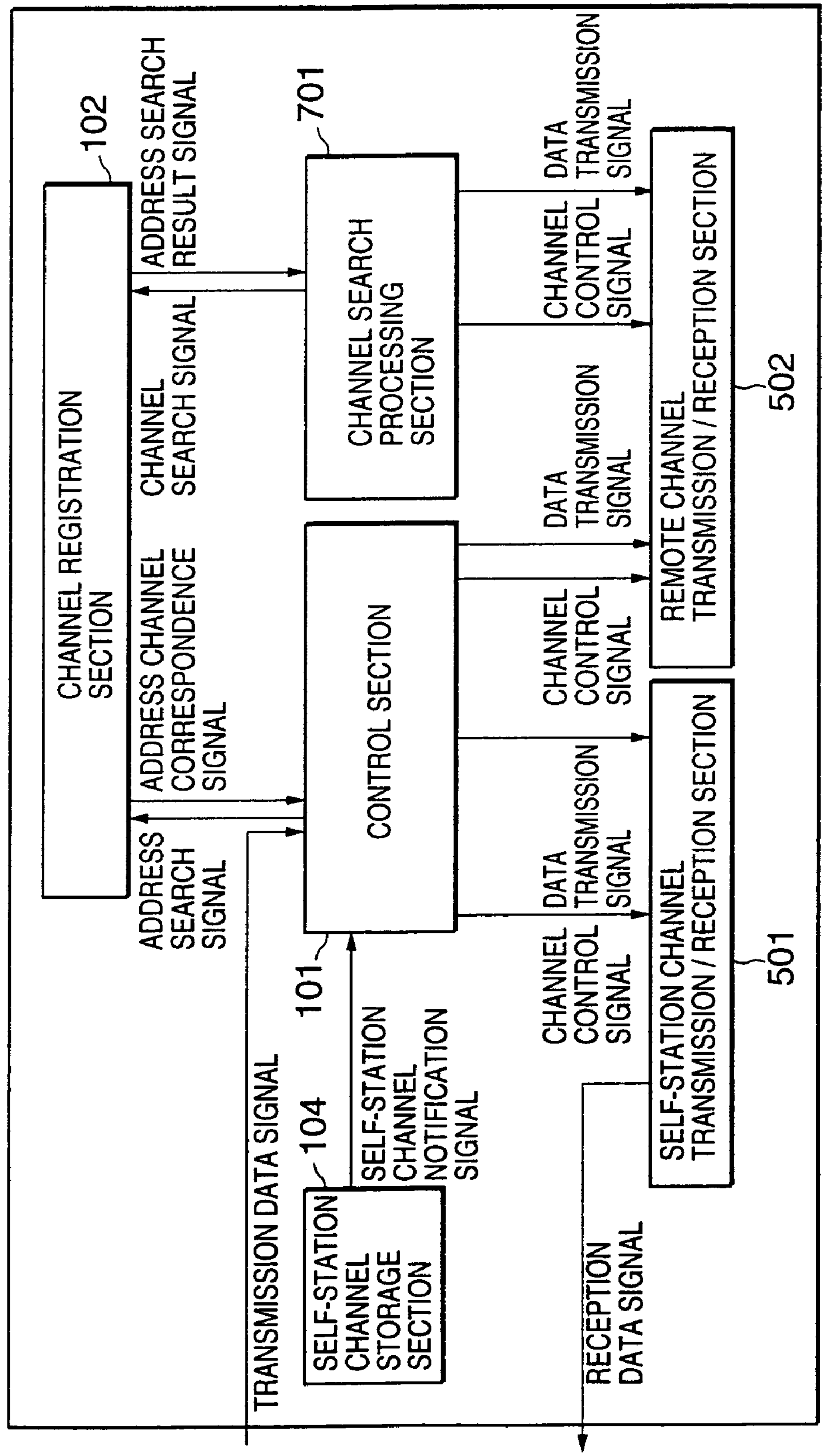
FIG. 10 is a block diagram showing the schematic arrangement of the fourth embodiment of the present invention.

FIG. 10 is a block diagram showing the schematic arrangement of the fourth embodiment of the present invention. The fourth embodiment of the present invention is a combination of the second and third embodiments of the present invention.

The fourth embodiment of the present invention is comprised of a channel control section 101, channel registration section 102, transmission/reception section 103, and self-station channel storage section 104 like those in the first embodiment, a self-station channel transmission/reception section 501 and remote channel transmission/reception section 502 like those in the second embodiment, and a channel search processing section 701 like the one in the third embodiment. The channel search processing section 701 performs search processing for a channel corresponding to a destination address by using the remote channel transmission/reception section 502.

Figure 11:
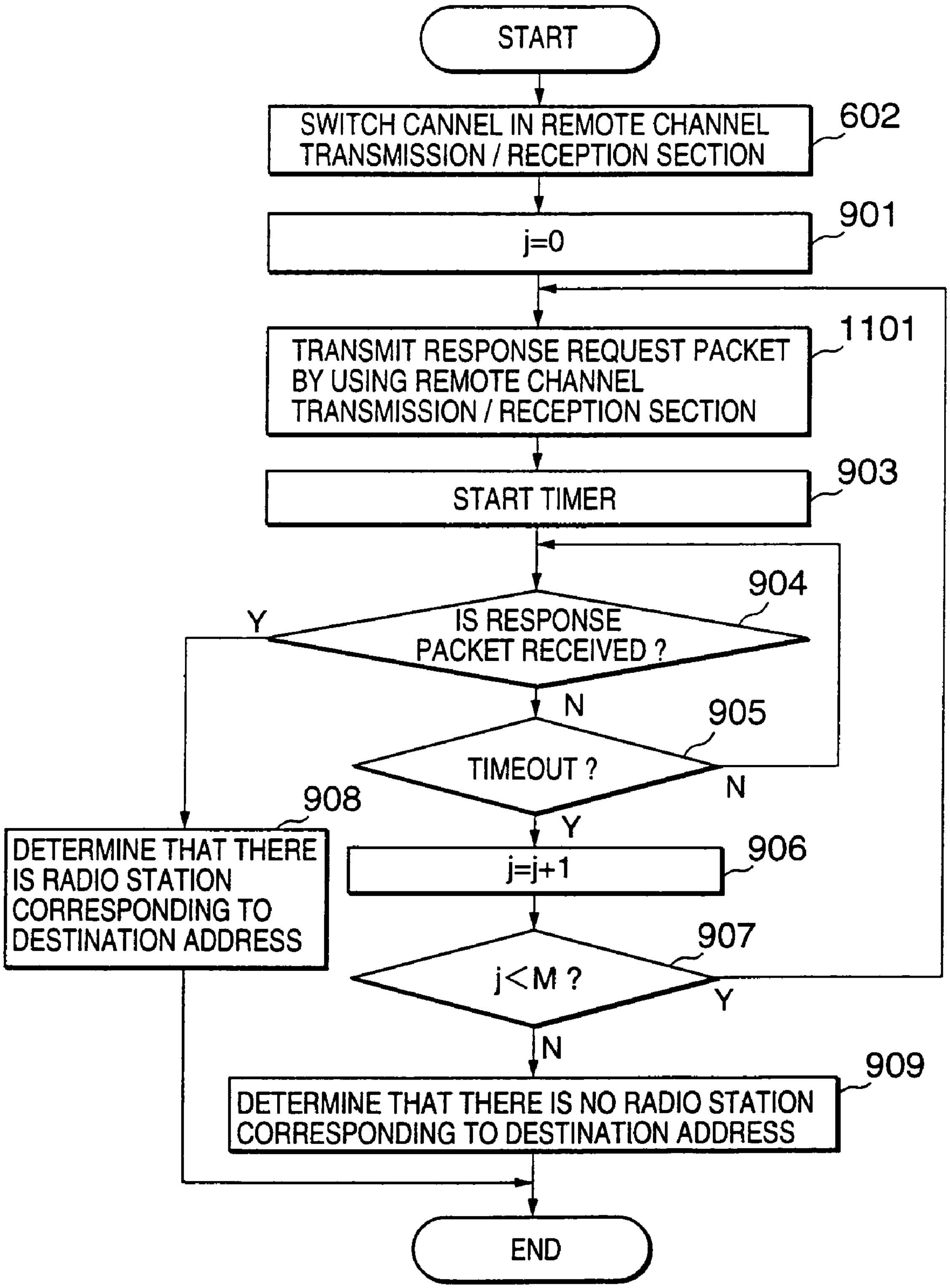
FIG. 11 is a flow chart showing detailed operation in a channel search procedure according to the fourth embodiment of the present invention.

The operation of the fourth embodiment of the present invention will be described next with reference to FIG. 11. FIG. 11 shows the details of operation in the procedure for searching for a radio station having the destination address in step 806 in FIG. 8. In the fourth embodiment, upon reception of a response request packet, the channel registration section 102 returns a response packet.

At the time of a search, first of all, the channel control section 101 switches the channel in the remote channel transmission/reception section 502 (step 602). The channel control section 101 then sets "j" representing a control packet retransmission count to 0 (step 901), transmits a response request packet to the destination address by using the remote channel transmission/reception section 502 (step 1101), and starts a timer (step 903).

The channel control section 101 then waits for the reception of a response packet (step 904) until the timer causes a timeout (step 905). When the timer reaches a predetermined value and causes a timeout (Y in step 905), one is added to "j" (step 906). If it is determined that is equal to or less than M (Y in step 907), the flow returns to step 902 to repeatedly transmit the response request packet.

In this case, M is a predetermined upper retransmission count limit value. If "j" exceeds the upper retransmission count limit value (N in step 907), it is determined there is no radio station corresponding to the destination address (step 909). If a response packet is received before the timer causes a timeout (Y in step 904), it is determined that there is a radio station corresponding to the destination address (step 908).

The above description has only exemplified the preferred embodiments of the present invention, and does not limit the range of the present invention. As is obvious to a person skilled in the art, various changes and modifications to which the invention pertains can be made within the spirit and scope of the invention.

What is claimed is:

1. A mobile radio communication apparatus for use in a mobile radio station operating in a radio packet communication system, the radio packet communication system constituted by a plurality of radio stations and having a plurality of radio channels, wherein each radio station belongs to a single radio link and a plurality of mobile radio stations belonging to a particular radio link communicate with other radio stations in that particular radio link using a single radio channel, said mobile radio communication apparatus comprising:

- means for registering a remote radio channel used by a remote mobile radio station and an address of said remote mobile radio station, wherein said remote mobile radio station belongs to a different radio link from said apparatus;
- means for selecting a radio channel based on an address of a destination mobile radio station identified in a packet to be transmitted; and
- means for transmitting the packet by using the selected radio channel,
- wherein if the destination mobile radio station is a remote mobile radio station and the remote radio channel is registered, the selected radio channel is the remote radio channel.

2. A mobile radio communication apparatus for use in a mobile radio station operating in a radio packet if the radio channel used by the destination mobile radio station for the packet to be transmitted is not registered, the packet is transmitted by using a radio channel used by the apparatus.

3. A mobile radio communication apparatus for use in a mobile radio station operating in a radio packet communication system according to claim 1, characterized by further comprising means for, when the selected radio channel differs from a radio channel which the apparatus uses for data reception, notifying that the apparatus cannot receive any packet, transmitting the packet by using the selected radio channel, and then notifying that the apparatus can receive a packet.

4. A mobile radio communication apparatus for use in a mobile radio station operating in a radio packet communication system according to claim 1, further comprising:

a channel transmission/reception section and a remote channel transmission/reception section for transmitting and receiving the packet.

5. A mobile radio communication apparatus for use in a mobile radio station operating in a radio packet communication system according to claim 1, characterized by further comprising means for searching for a radio channel used by a destination mobile radio station and registering the found radio channel.

6. A mobile radio communication apparatus for use in a mobile radio station operating in a radio packet communication system according to claim 5, characterized in that said means for searching for the radio channel and registering the found radio channel searches a radio channel by transmitting and receiving a control packet at the time of a radio channel search.

7. A mobile radio communication apparatus for use in a mobile radio station operating in a radio packet communication system according to claim 2, further comprising:

a channel transmission/reception section and a remote channel transmission/reception section for transmitting and receiving the packet.

8. A mobile radio communication apparatus for use in a mobile radio station operating in a radio packet communication system according to claim 2, characterized by further comprising means for searching for a radio channel used by a destination mobile radio station and registering the found radio channel.

9. A mobile radio communication apparatus for use in a mobile radio station operating in a radio packet communication system according to claim 1, characterized by further comprising means for searching for a radio channel used by a destination mobile radio station and registering the found radio channel.

10. A mobile radio communication apparatus for use in a mobile radio station operating in a radio packet communication system according to claim 4, characterized by further comprising means for searching for a radio channel used by a destination radio station and registering the found radio channel.

11. A mobile radio communication apparatus for use in a mobile radio station operating in a radio packet communication system according to claim 8, characterized in that said means for searching for the radio channel and registering the found radio channel searches a radio channel by transmitting and receiving a control packet at the time of a radio channel search.

12. A mobile radio communication apparatus for use in a mobile radio station operating in a radio packet communication system according to claim 9, characterized in that said means for searching for the radio channel and registering the found radio channel searches a radio channel by transmitting and receiving a control packet at the time of a radio channel search.

13. A mobile radio communication apparatus for use in a mobile radio station operating in a radio packet communication system according to claim 10, characterized in that said means for searching for the radio channel and registering the found radio channel searches a radio channel by transmitting and receiving a control packet at the time of a radio channel search.

14. A mobile radio communication apparatus for use in a mobile radio station operating in a radio packet communication system, wherein the radio packet communication system comprises a plurality of radio stations and having a plurality of radio channels, wherein each radio station belongs to a single radio link and a plurality of mobile radio stations belonging to a particular radio link communicate with other radio stations in that particular radio link using a single radio channel, wherein said mobile radio communication apparatus comprises:

a channel registration section that stores an address of a remote mobile radio station and an associated radio channel used by said remote mobile radio station, wherein said remote mobile radio station belongs to a different radio link from said apparatus;

a channel control section that selects a radio channel corresponding to a destination mobile radio station address in a packet to be transmitted; and a radio transceiver that transmits the packet using the selected radio channel if said destination mobile radio station address is stored.

* * * * *